United States Patent
Maddah-Ali (10) Patent No.: US 8,838,020 B2
(45) Date of Patent: Sep. 16, 2014

(54) METHOD FOR RELAYING DATA IN A COMMUNICATION NETWORK

(75) Inventor: Mohammadali Maddah-Ali, Piscataway, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 415 days.

(21) Appl. No.: 13/222,234

(22) Filed: Aug. 31, 2011

(65) Prior Publication Data

US 2013/0052942 A1     Feb. 28, 2013

(51) Int. Cl.
| | |
|---|---|
| *H04B 7/15* | (2006.01) |
| *H04B 7/155* | (2006.01) |
| *H04W 84/04* | (2009.01) |
| *H04B 7/02* | (2006.01) |
| *H04W 72/04* | (2009.01) |
| *H04B 7/26* | (2006.01) |
| *H04W 88/04* | (2009.01) |

(52) U.S. Cl.
CPC ........... *H04B 7/1555* (2013.01); *H04W 84/047* (2013.01); *H04B 7/026* (2013.01); *H04W 72/0413* (2013.01); *H04B 7/2606* (2013.01); *H04W 88/04* (2013.01)
USPC ............................. 455/11.1; 455/13.1; 455/16

(58) Field of Classification Search
CPC .............. H04W 88/04; H04W 84/047; H04W 72/0413; H04B 7/1555; H04B 7/026; H04B 7/2606

USPC ................ 455/3.02, 427, 428, 430, 431, 7–9, 455/11.1, 12.1, 13.1, 13.2, 14–17; 340/425.1; 370/226, 293, 246, 274, 370/279, 315, 316, 492, 501
See application file for complete search history.

(56) References Cited

U.S. PATENT DOCUMENTS

| | | | |
|---|---|---|---|
| 8,477,677 B2 * | 7/2013 | Naden ........................... 370/315 |
| 8,478,283 B2 * | 7/2013 | Periyalwar et al. ......... 455/452.1 |
| 2002/0035554 A1 * | 3/2002 | Katsuno et al. .................. 706/17 |
| 2005/0014464 A1 * | 1/2005 | Larsson ....................... 455/11.1 |
| 2005/0201316 A1 * | 9/2005 | Fukuhara et al. ............. 370/315 |
| 2006/0219854 A1 * | 10/2006 | Sardina et al. ............. 248/230.1 |
| 2008/0045139 A1 * | 2/2008 | Chen et al. .................... 455/3.04 |
| 2008/0107063 A1 * | 5/2008 | Oleszczuk .................... 370/315 |
| 2008/0274692 A1 | 11/2008 | Larsson |
| 2009/0011700 A1 * | 1/2009 | Nishio et al. ...................... 455/7 |
| 2009/0097433 A1 * | 4/2009 | Shen et al. .................... 370/315 |
| 2009/0207778 A1 | 8/2009 | Wang et al. |
| 2009/0221231 A1 * | 9/2009 | Weng et al. .................... 455/15 |
| 2009/0268662 A1 * | 10/2009 | Larsson et al. ................ 370/328 |

(Continued)

FOREIGN PATENT DOCUMENTS

GB     2428538     1/2007

OTHER PUBLICATIONS

International Search Report and Written Opinion mailed Jul. 8, 2013 in PCT International Application No. PCT/US2012/052633.

*Primary Examiner* — Dominic E Rego
(74) *Attorney, Agent, or Firm* — Harness, Dickey & Pierce (57) ABSTRACT

Example embodiments may include a method for transmitting a first transmit signal to a first relay. The first transmit signal may include a first data with a first direction and a second data with a second direction. The method may further include transmitting a second transmit signal to a second relay. The second transmit signal may include a third data with the first direction and a fourth data with the second direction.

20 Claims, 7 Drawing Sheets

(56) References Cited

U.S. PATENT DOCUMENTS

| | | | |
|---|---|---|---|
| 2010/0014453 A1* | 1/2010 | Erkip et al. | 370/315 |
| 2010/0027458 A1* | 2/2010 | Wu et al. | 370/315 |
| 2010/0080164 A1* | 4/2010 | Power et al. | 370/315 |
| 2010/0195561 A1* | 8/2010 | Yamaguchi et al. | 370/315 |
| 2010/0303134 A1* | 12/2010 | Kawasaki | 375/211 |
| 2011/0294415 A1* | 12/2011 | Jeon et al. | 455/7 |
| 2011/0299617 A1* | 12/2011 | Maddah-Ali et al. | 375/267 |

* cited by examiner

METHOD FOR RELAYING DATA IN A COMMUNICATION NETWORK

BACKGROUND

Wireless networks may use multiple relays to extend the coverage or improve the reliability of the network. The relays may be half-duplex network elements that communicate in both a first and a second direction, such as an uplink and/or a downlink direction. However, during communication with other elements the multiple relays may cause interference to each other.

SUMMARY

At least one example embodiment may include a method for relaying data. The method may include transmitting a first transmit signal to a first relay, the first transmit signal including a first data with a first direction and a second data with a second direction. The method may further include transmitting a second transmit signal to a second relay, the second transmit signal including a third data with the first direction and a fourth data with the second direction.

In the method of the example embodiment, the first data includes a first data vector, the second data includes a second data vector, the third data includes a third data vector, and the fourth data includes a fourth data vector.

In another example embodiment, the first transmit signal is transmitted based on interference caused by the second relay to the first relay.

In another example embodiment, the second transmit signal is transmitted based on interference caused by the first relay to the second relay In a further example embodiment, the first data is relayed by the first relay to a first receiver and the third data is relayed by the second relay towards the first receiver.

In another example embodiment the second data is relayed by the first relay to a second receiver and the fourth data is relayed by the second relay towards the second receiver.

The method in another example embodiment, may include receiving, by a first relay, a first transmit signal including a first data and a second data. The method may further include determining at least one channel characteristic for relaying the first data on a first channel and the second data on a second channel based on interference caused by a second relay. The method may also include transmitting, by the first relay, the first transmit signal based on the determined at least one channel characteristic.

In a further example embodiment, the method may include transmitting the first data on the first channel to a first receiver, and transmitting the second data on the second channel to a second receiver.

In a further example embodiment the first transmit signal includes a first relay vector for the first data and a second relay vector for the second data.

In another example embodiment, the first data is a first data vector that has a first direction and the second data is a second data vector that has a second direction.

In another example embodiment, the at least one channel characteristic is that the first direction is perpendicular to a channel matrix between the first relay and the second receiver.

In a further example embodiment the second data is transmitted in a direction that is orthogonal to the product of the interference caused by the second relay and the first direction.

In another example embodiment, the at least one channel characteristic is that the second direction is perpendicular to a channel matrix between the first relay and the first receiver.

In a further example embodiment, the first data is transmitted in a direction that is orthogonal to a product of the interference caused by the second relay and the second direction.

In another example embodiment, the method may include receiving, by the second relay, a second transmit signal including a third data and a fourth data, while the first relay receives the first transmit signal. The method may further include determining at least one further channel characteristic for relaying the third data on the first channel and the fourth data on the second channel based on interference caused by the first relay. The method may also include transmitting, by the second relay, the second transmit signal based on the determined at least one further channel characteristic.

Another example embodiment may include transmitting the third data on the first channel to the first receiver, and transmitting the fourth data on the second channel to a second receiver.

A method according to another example embodiment may include receiving, at a first receiver, a relay signal from a first relay and a second relay signal from a second relay, the first relay signal including a first data and a second data and the second relay signal including a third data and a fourth data.

In another example embodiment the first data is received on a first channel and the second data is received on the first channel.

In a further example embodiment, the first data and the third data include a first direction, and the second data and the fourth data include a second direction.

In another example embodiment the first data and the third data are received as a linear combination.

BRIEF DESCRIPTION OF THE DRAWINGS

Example embodiments will be more clearly understood from the following detailed description taken in conjunction with the accompanying drawings. FIGS. 1-7 represent non-limiting, example embodiments as described herein.

DETAILED DESCRIPTION

Various example embodiments will now be described more fully with reference to the accompanying drawings in which some example embodiments are illustrated. In the drawings, the thicknesses of layers and regions may be exaggerated for clarity.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes (e.g., a scheduler located at a cell site, base station or Node B). Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of example embodiments are typically encoded on some form of tangible (or recording) storage medium or implemented over some type of transmission medium. The tangible storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. Example embodiments are not limited by these aspects of any given implementation.

The term "base station" may be considered synonymous to, and may hereafter be occasionally referred to, as a relay, transmitter, receiver, base transceiver station (BTS), etc., and may describe a transceiver in communication with and providing wireless resources to mobiles in a wireless communication network or other networks like optical networks. As discussed herein, base stations may have all functionally associated with conventional, well-known base stations in addition to the capability to perform the methods discussed herein.

As used herein, the term "user equipment" (UE) may be synonymous to a mobile user, mobile station, mobile terminal, user, subscriber, wireless terminal and/or remote station and may describe a remote user of wireless resources in a wireless communication network. The term "cell site" may be understood as a one or more cell sites, base stations, access points, and/or any terminus of radio frequency communication. Although current network architectures may consider a distinction between mobile/user devices and access points/cell sites, the example embodiments described hereafter may generally be applicable to architectures where that distinction is not so clear, such as ad hoc and/or mesh network architectures, for example. Serving cell site may refer to the cell site currently handling the needs of the UE.

Further, as used herein the term vector may include any geometrical object that has both a magnitude and a direction. The vectors may be defined in any multi dimensional space, defined over time, frequency bandwidth, antenna, etc. Additionally, example embodiments may be applied to any multi-dimensional space, like multi-bandwidth, OFDM, OFDMA, CDMA, MIMO, time-expansion. Further example embodiments may be applied to macro-cells, picocells and or micro-cells.

In addition, data intended for either any receiver within an example embodiment may be decoded by any other receiver within the system to improve the data rate of the example embodiment.

Although the following examples reference a single transmitter, two relays and two receivers, the network as described within example embodiments may use numerous combinations of a plurality of transmitters, relays and/or receivers.

Figure 1:
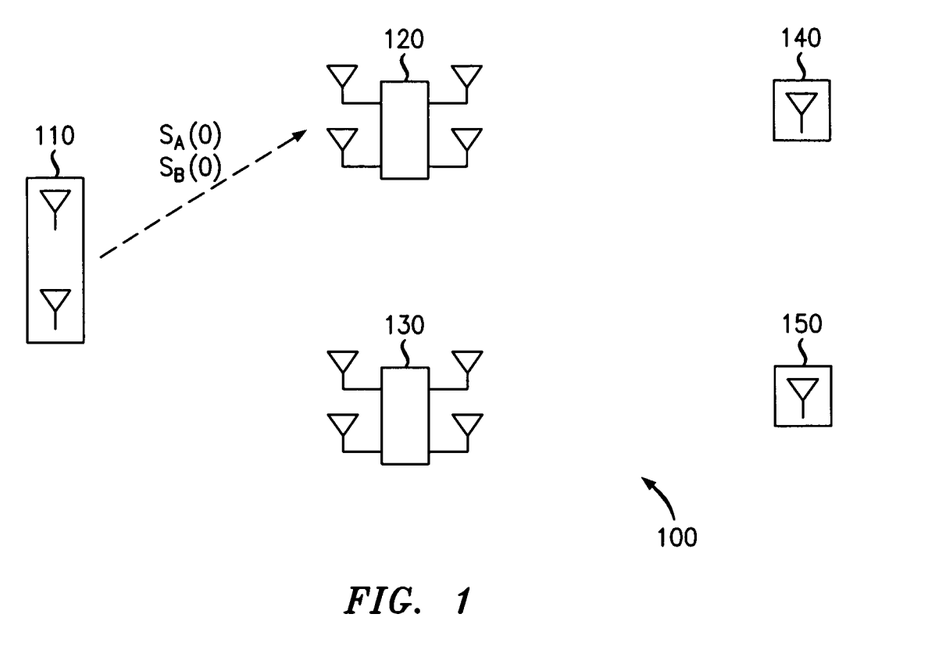
FIG. 1 illustrates a network to relay data.

FIG. 1 illustrates a wireless communication system 100 including a transmitter 110, a first relay 120, a second relay 130, a first receiver 140 and a second receiver 150.

For example the transmitter 110 may be a mobile user or a mobile device transferring data via the first relay 120 and/or the second relay 130. In a further example embodiment, the transmitter 110 may be a base station or cell cite handling the needs of an end user. In another example embodiment, first relay 120 and/or the second relay 130 may be base stations, access points or another other system element capable of transmitting and receiving data. In a further example embodiment, the first receiver 140 and the second receiver 150 may be base stations, access points and/or mobile users.

Figure 2:
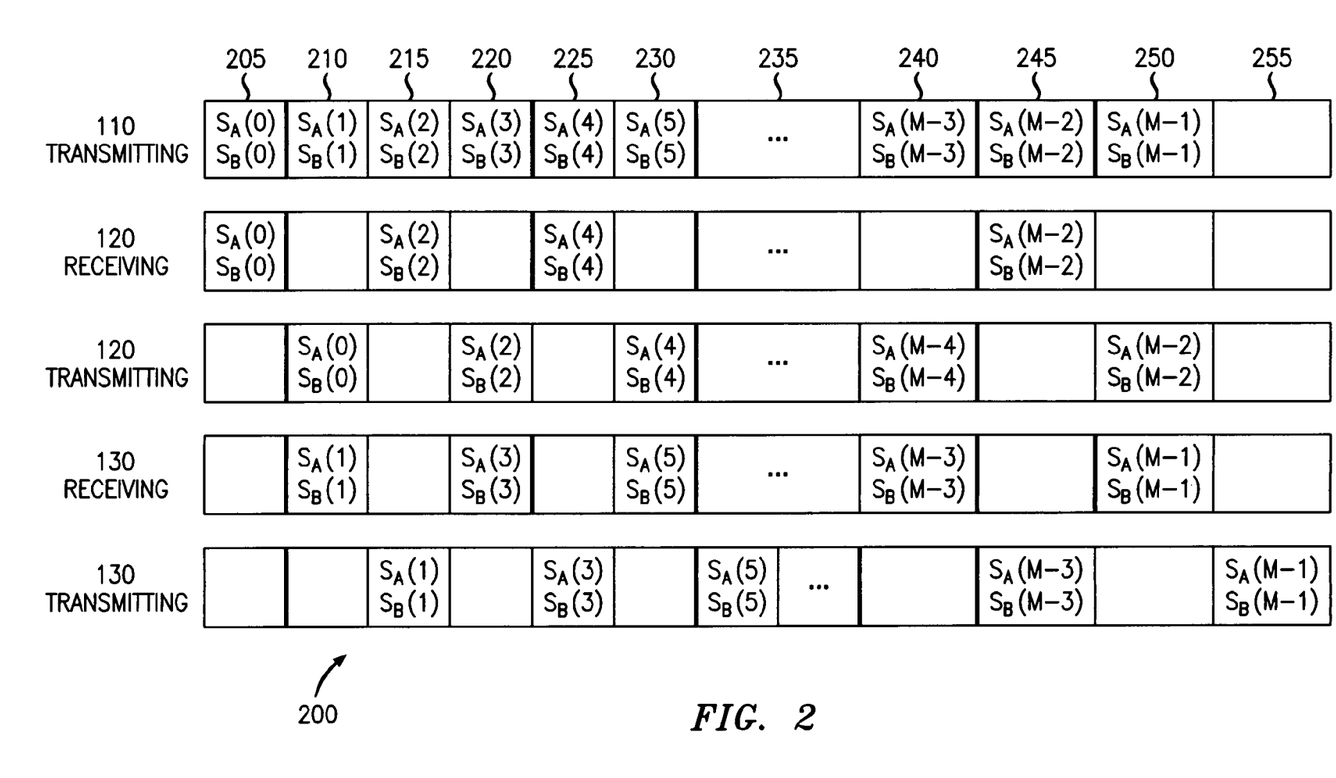
FIG. 2 illustrates a table showing the performance of elements as shown in FIG. 1 during different time periods.

Further, FIG. 2 illustrates a table of the data being received and transmitted between the different elements of the wireless communication system 100 during different time periods.

During a first time period 205, the transmitter 110 may transmit a first data $S_A(0)$ and a second data $S_B(0)$ towards the first relay 120. The first data $S_A(0)$ carries information for the first receiver 140 and the second data $S_B(0)$ carries information for the second receiver 150.

Figure 3:
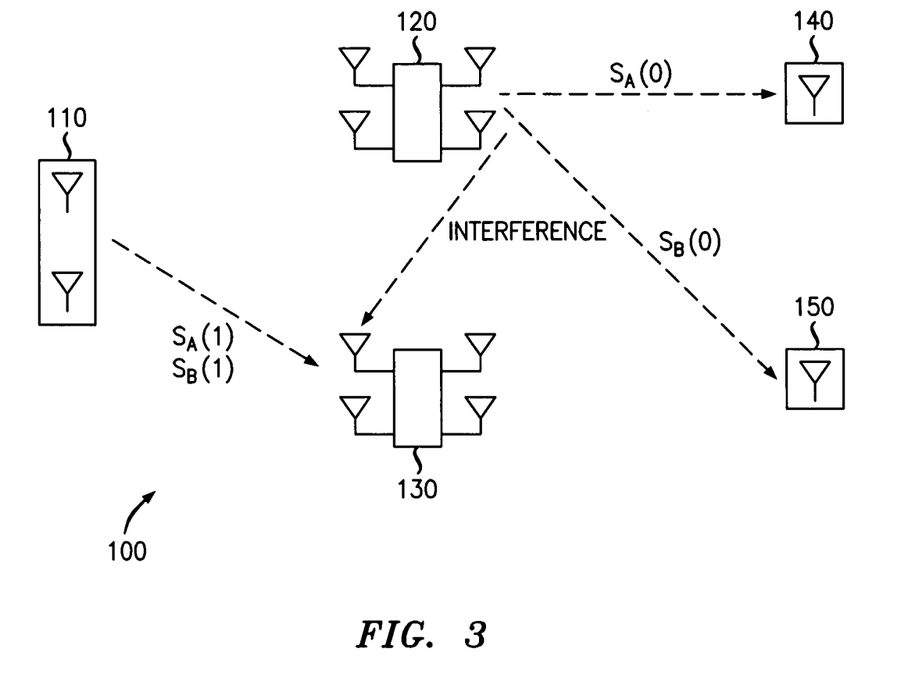
FIG. 3 illustrates a network for relaying data.
Figure 4:
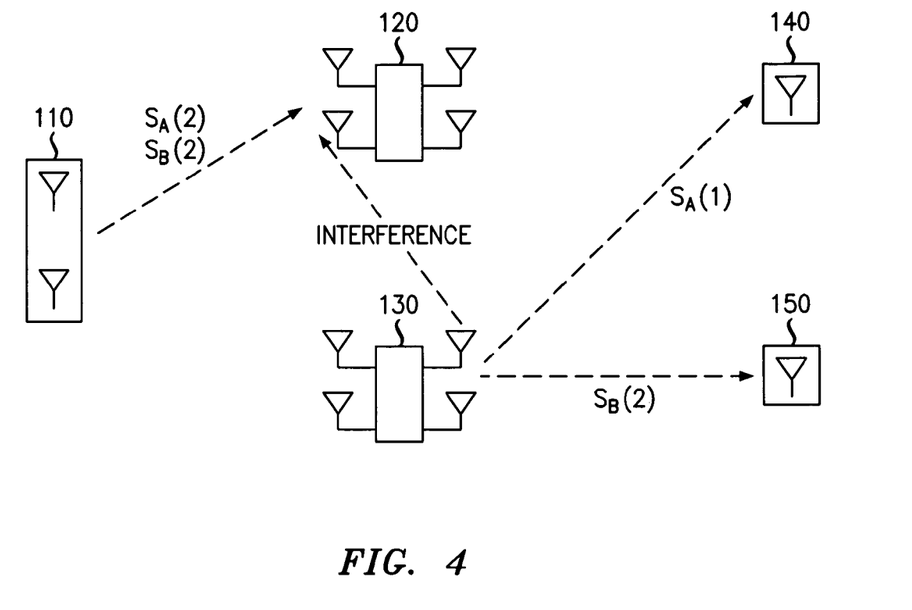
FIG. 4 illustrates a network for relaying data.

FIGS. 3 and 4 illustrate the wireless communication system 100 performing operations during a second time period 210 and a third time period 215 of FIG. 2.

During the second time period 210, the transmitter 110 may transmit a third data $S_A(1)$ and a fourth data $S_B(1)$ towards the second relay 130. The third data $S_A(1)$ carries information for the first receiver 140 and the fourth data $S_B(1)$ carries information for the second receiver 140. Additionally during the second time period 210, while the second relay 130 receives the third data $S_A(1)$ and the fourth data $S_B(1)$ from the transmitter 110, the first relay 120 may transmit the first data $S_A(0)$ and the second data $S_B(0)$ towards the first receiver 140 and the second receiver 150, respectively.

Accordingly during the second time period 210, the first relay 120 may be transmitting data while the second relay 130 is receiving data.

However, while the first relay 120 is transmitting the first data $S_A(0)$ and the second data $S_B(0)$ towards the first receiver 140 and the second receiver 150, respectively, the first relay 120 may cause interference for the second relay 130 if receiving the third data $S_A(1)$ and the fourth data $S_B(1)$ from the transmitter 110.

During the third time period 215, the transmitter 110 may transmit a fifth data $S_A(2)$ and a sixth data $S_B(2)$ towards the first relay 120. The fifth data $S_A(2)$ carries information for the first receiver 140 and the sixth data $S_B(2)$ carries information for the second receiver 150.

During the third time period 215 while the first relay 120 receives the fifth data $S_A(2)$ and a sixth data $S_B(2)$ from the transmitter 110, the second relay 130 may transmit the third data $S_A(1)$ and the fourth data $S_B(1)$ towards the first receiver 140 and the second receiver 150, respectively.

Accordingly during the second time period 210, the second relay 130 may transmit data while the first relay 120 may be receiving data.

However, while the second relay 130 is transmitting the third data $S_A(1)$ and the fourth data $S_B(1)$ towards the first receiver 140 and the second receiver 150, respectively, the second relay 130 may cause interference for the first relay 110 receiving the fifth data $S_A(2)$ and the sixth data $S_B(2)$ from the transmitter 110.

Further, FIG. 2 illustrates time periods 225 to 255 that show a repetition of time periods 210 and 215 for M time periods.

Figure 5:
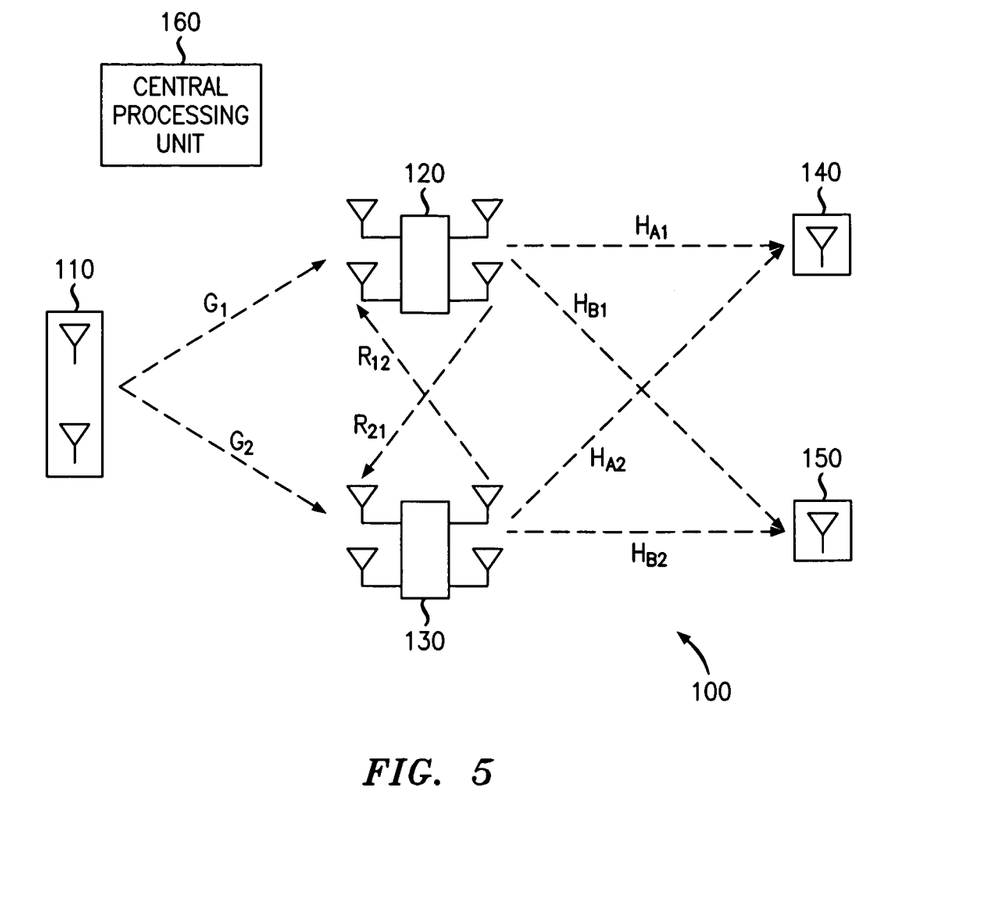
FIG. 5 illustrates a network for relaying data.

FIG. 5 illustrates the network 100 shown in FIG. 1 with a central processing unit 160.

Central processing unit 160 refers to a network element that is coupled to the transmitter 110, the first relay 120, the second relay 130, the first receiver 140 and the second receiver 150. Further, the central processing unit 160 is able to transfer and receive data from the transmitter 110, the first relay 120, the second relay 130, the first receiver 140 and the second receiver 150 through various backbones and feedback channels within the network 100.

The central processing unit 160 may perform channel estimation throughout the wireless communication network 100 by various channel estimation methods. More so, the channel estimations may be updated using feedback channels within the network 100 by the transmitter 110, the first relay 120, the second relay 130, the first receiver 140 and/or the second receiver 150 during data communication within the network 100. However, because channel estimation techniques are known in the art, a description herein will be omitted for brevity.

Referring to FIG. 5, $G_1$ represents the channel matrix between the transmitter 110 and the first relay 120. $G_2$ represents the channel matrix between the transmitter 110 and the second relay 130. $H_{A1}$ represents the channel matrix between the first relay 120 and the first receiver 140. $H_{B1}$ represents the channel matrix between the first relay 120 and the second receiver 150. Further, $H_{A2}$ represents the channel matrix between the second relay 130 and the first receiver 140. $H_{B2}$ represents the channel matrix between the second relay 130 and the second receiver 150.

More so, $R_{12}$ represents the interference between the second relay 130 and the first relay 120 and $R_{21}$ represents the interference between the first relay 120 and the second relay 130.

If the first relay 120 or the second relay 130 is transmitting data, the relay transmitting data causes interference to the other respective relay. Accordingly, the central processing unit 160 may module the respective uplink and/or downlink channels for the first relay 120 and the second relay 130 taking into consideration the above-mentioned interference.

For example, the channel between the transmitter 110 and the first relay 120 may be modeled by transmitter 100 and/or central processing unit 160 using the following equation (1).

$$Y1 = G_1 X + R_{12} S2 + Z_1 \qquad (1)$$

In equation (1), X denotes the transmitted vector of the signal, $G_1$ denotes the channel matrix between the transmitter 110 and the first relay 120, S2 denotes a signal transmitted by the second relay 130 such that $R_{12} S2$ denotes the interference caused by the second relay 130, $Z_1$ denotes the additive noise at the first relay 110 and Y1 denotes the signal received at the first relay 120.

Further the channel between the transmitter 110 and the second relay 130 may be modeled by the transmitter 110 and/or the central processing unit 160 using the following equation (2)

$$Y2 = G_2 X + R_{21} S1 + Z_2 \qquad (2)$$

In equation (2), X denotes the transmitted vector of the signal, $G_2$ denotes the channel matrix between the transmitter 110 and the second relay 130, S1 denotes a signal transmitted by the second relay 130 such that $R_{21} S1$ denotes the interference caused by the first relay 120, $Z_1$ denotes the additive noise at the first relay 120 and Y2 denotes the signal received at the second relay 130.

The channel between the first relay 120, the second relay 130 and the first receiver 140 may be modeled by the first relay 120, the second relay 130 and/or the central processing unit 160 using the following equation (3).

$$Y_A = H_{A1}S1 + H_{A2}S2 + Z_A \quad (3)$$

In equation (3), $H_{A1}$ denotes the channel matrix between the first relay 120 and the first receiver 140, S1 denotes the signal transmitted from the first relay 120, $H_{A2}$ denotes the channel matrix between the second relay 130 and the first receiver 140, S2 denotes the signal transmitted from the second relay 130, $Z_A$ denotes the additive noise at the first receiver 140 and the first receiver 140 and $Y_A$ denotes the received signal at the first receiver 140.

The channel between the first relay 120, the second relay 130 and the second receiver 150 may be modeled by the first relay 120 and the second relay 130 and/or the central processing unit 160 using the following equation (4).

$$Y_B = H_{B1}S1 + H_{B2}S2 + Z_B \quad (4)$$

In equation (4), $H_{B1}$ is the channel matrix between the first relay 120 and the second receiver 150, S1 denotes the signal transmitted from the first relay 120, $H_{A2}$ is the channel matrix between the second relay 130 and the second receiver 150, S2 denotes the signal transmitted from the second relay 130, $Z_B$ denotes the additive noise at the second receiver 150 and the first receiver 140 and $Y_B$ denotes the received signal at the second receiver 150.

A first method that may be used to manage the inter-relay interference using the above-mentioned channel matrices may be dirty paper coding (DPC). However, because dirty paper coding is known in the art, a description herein will be omitted for brevity. Other methods to manage the inter-relay interference may be pre-cancellation, pre-subtraction, limited-dimensional TH schemes, vector-perturbation, MMSE pre-cancellation, zero-forcing or distribute MMSE pre-coding relays, etc. However, because these methods are known in the art, a description herein will be omitted for brevity.

A second technique that may be used for managing the inter-relay interference is called inter-symbol interference alignment. Inter-symbol interference alignment is described in more detail below with reference to FIG. 6.

Figure 6:
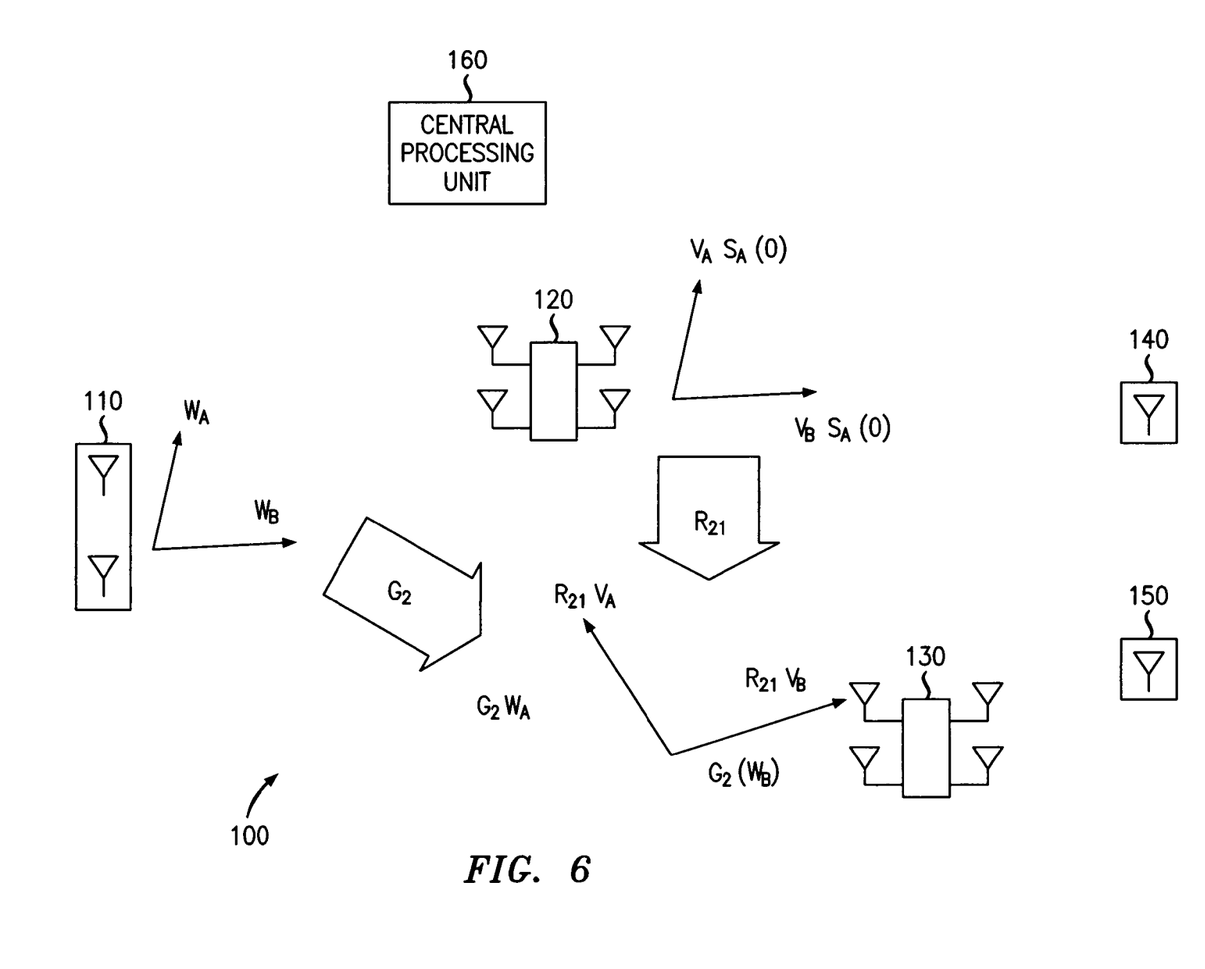
FIG. 6 illustrates a network for relaying data.

As discussed above in regards to FIG. 2, during the second time period 210 the transmitter 110 may transmit the third data $S_B(1)$ and the fourth data $S_B(1)$ towards the second relay 130. In FIG. 6, the third data $S_A(1)$ and the fourth data $S_B(1)$ are transmitted from the transmitter 110 towards the second relay 130 in the directions $W_A$ and $W_B$, respectively.

Additionally, during the second time period 210 while the second relay 130 receives the third data $S_A(1)$ and the fourth data $S_B(1)$ from the transmitter 110, the first relay 120 transmits the first data $S_A(0)$ and the second data $S_B(0)$ towards the first receiver 140 and the second receiver 150, respectively.

The transmitter 110 transmits data for the first receiver 140 via the second relay 130 in the direction $W_A$. The direction $W_A$ may be a desired or preferred channel characteristic determined by the central processing unit 160 after channel estimation.

Further, the transmitter 110 transmits data for the second receiver 150 via the second relay 130 in the direction $W_B$. The direction $W_B$ may be a desired or preferred channel characteristic determined by the central processing unit 160 after channel estimation.

Accordingly, to determine the transmit vector X used by the transmitter 110, as represented above in equations (1) and (2) the following equation (5) may be used.

$$X = n\{S_A(k)W_A + S_B(k)W_B\} \quad (5)$$

In equation (5), n is a scaling factor to satisfy power constraints of the wireless network 100, $S_A(k)$ is the signal transmitted towards the first receiver 140 via the second relay 130, $W_A$ is the direction used to transmit signals for the first receiver 140, $S_B(k)$ is the signal transmitted towards the second receiver 150 via the second relay 130 and $W_B$ is the direction used to transmit signals for the second receiver 150.

Further, K denotes various time periods wherein the transmitter 110 is transmitting data either towards the first relay 120 or the second relay 130.

The transmitter 110 may use transmit vector X for data being transmitted by the transmitter 110 for the first receiver 140 via the first relay 120 in the direction $W_A$ if K represents data transmitted by the transmitter to the first relay 120. Further, the transmitter 110 may transmit data for the second receiver 150 via the first relay 120 in the direction $W_B$ if K represents data transmitted by the transmitter to the first relay 120.

Similarly, the transmitter 110 may use transmit vector X for data being transmitted by the transmitter 110 for the first receiver 140 via the second relay 130 in the direction $W_A$ when K represents data transmitted by the transmitter to the second relay 130. Further, the transmitter 110 may transmit data for the second receiver 150 via the second relay 150 in the direction $W_B$ when K represents data transmitted by the transmitter to the second relay 130.

Furthermore, a relay transmit vector for the first relay 120 and the second relay 130 may be determined by the central processing unit 160 using the following equation (6).

$$X_1 = n_1\{S_A(K)V_A + S_B(K)V_B\} \quad (6)$$

The first relay 120 and/or the second relay 130 may transmit data for the first receiver 140 in the direction $V_A$. The direction $V_A$ may be a desired or preferred channel characteristic to control, minimize or reduce interference caused by transmitted data signals within the network.

Further, the first relay 120 and/or the second relay 130 transmits data for the second receiver 150 in the direction $V_B$. The direction $V_B$ may be a desired or preferred channel characteristic to control, minimize or reduce interference caused by transmitted data signals within the network.

In equation (6) $n_1$ is a scaling factor; $X_1$ denotes the relay transmit vector transmitted by the first relay 120 or the second relay 130.

In an example embodiment, the first relay 120 and the second relay 130 may use any signaling scheme for MIMO broadcast channels. In an example embodiment as illustrated below, a zero-forcing scheme is used.

Furthermore, the direction $V_A$ and/or the direction $V_B$ may determined by the central processing unit 160 during channel estimation and/or updated by the central processing unit 160, the first relay 120 and/or the second relay 130 during data transmission.

Thus, to control, minimize or reduce interference between network elements within the network 100, the central processing 160 unit may choose the directions $V_A$ and $V_B$ for data transmitted by the first relay 120, such that, $$V_A \perp H_{B1} \text{ and } V_B \perp H_{A1} \quad (7B)$$

In a similar manner, the central processing unit 160 may choose the directions $V_A$ and $V_B$ for data transmitted by the first relay 120, such that, $$V_A \perp H_{B2} \text{ and } V_B \perp H_{A2} \quad (7A)$$

Furthermore, the direction of the antennas of the first relay 120 may be positioned in a direction to increase or maximize the gain and/or data rate of the first relay 120. Also, embodiments may also encompass some misalignment in favor of increasing the overall gain, overall rate, and/or improve fairness.

Therefore, the direction $V_A$ is based on interference caused by data transmitted towards the second receiver 150, and $V_B$ is based on interference caused by data transmitted towards the first receiver 140.

In an example embodiment, to manage interference caused by the first relay 120, the second relay 130 receives the transmitted signal from the transmitter 110 as illustrated by the following equations (8A) and (8B).

$$Y2 = nG_2W_AS_A(1) + n_1R_{21}V_AS_A(0) + nG_2W_B S_B(1) + n_1R_{21}V_BS_B(0) + Z_2 \quad (8A)$$

$$Y1 = nG_1W_AS_A(0) + n_1R_{12}V_AS_A(1) + nG_2W_BS_B (0) + n_1R_{12}V_BS_B(1) + Z_1 \quad (8B)$$

More specifically, the central possessing unit 160 may determine $n_1R_{21}V_AS_A(\mathbf{0})$ and $n_1R_{21}V_BS_B(\mathbf{0})$ as the interference caused by the first relay 120.

In a similar manner, the central processing unit 160 may determine equation (8B) as shown above, to manage interference caused by the second relay 130 by determining the interferences $n_1R_{12}V_AS_A(\mathbf{1})$ and $n_1R_{12}V_BS_B(\mathbf{1})$ caused by the second relay 130.

Also, the direction of the antennas of the first relay 120 and the second relay 130 may be positioned in a direction to increase or maximize the gain and/or data rate of the first relay 120.

Furthermore, as shown in the above equations (8A) and (8B), $S_A(\mathbf{0})$ and $S_B(\mathbf{0})$ will have interference at the second relay 130 in two directions $R_{21}V_A$ and $R_{21}V_B$. Moreover, the contributions of $S_A(\mathbf{1})$ and $S_B(\mathbf{1})$ arrive at the second relay 130 in the directions of $G_2W_A$ and $G_2W_B$, respectively. Using equations (5) and (6) as described above, Y2 may be determine by the second relay 130, where Y2 is the received signal by the second relay 130, as shown in equation (8A). Furthermore, using equations (5) and (6) as described above, Y1 may be determined by central processing unit 160, where Y1 is the received signal by the first relay 120, as shown in equation (8B).

Further, to manage interference caused by the first relay 120, in an example embodiment the central processing unit 160 may choose $W_A$ and $W_B$ if transmitting data from the transmitter 110 to the second relay 130 such that, $$G_2W_A \| R_{21}V_A \quad (9A)$$

$$G_2W_B \| R_{21}V_B \quad (10A)$$

In a similar fashion, to manage interference caused by the second relay 130, in an example embodiment the central processing unit 160 may choose $W_A$ and $W_B$ if transmitting data from the transmitter 110 to the first relay 120 such that, $$G_1W_A \| R_{12}V_A \quad (9B)$$

$$G_1W_B \| R_{12}V_B \quad (10B)$$

In a further example embodiment, the transmitter 110 may choose $W_A$ and $W_B$ to meet the above mentioned equations based on channel estimation data stored on the transmitter 110.

Furthermore, based on feedback from the first relay 120 and the second relay 130, the transmitter 110 and/or the central processing unit 160 may update the channel estimations within the network 100. Therefore, based on the updated channel estimations the transmitter 110 and/or the central processor may update the directions of $W_A$ and $W_B$.

In view of the above-mentioned equations, the central processing unit 160 manages interference caused by the first relay 120 by the central processing unit 160 determining a projected direction $\Psi_A y_2$ to transmit data to the second receiver 150 that is orthogonal to $G_2W_B \| R_{21}V_B$ to meet equation (11A), which has minimal, reduced or no interference from data streams that are intended for the second receiver 150. Similarly, the central processing unit 160 manages interference caused by the second relay 130 by determining a project direction $\Psi_A y_1$ to transmit data to the second receiver 150 that is orthogonal to $G_1W_B \| R_{12}V_B$ to meet equation (11B).

$$\Psi_A y_2 = n\Psi_A G_2 W_A S_A(1) + n_1 \Psi_A R_{21} V_A S_A(0) + Z_2 \Psi_A \quad (11A)$$

$$\Psi_A y_1 = n\Psi_A G_1 W_A S_A(0) + n_1 \Psi_A R_{12} V_A S_A(1) + Z_1 \Psi_A \quad (11B)$$

Similar to equation (11A), the second relay 130 may manage interference caused by the first relay 120 by determining a projected direction $\Psi_B y_2$ to transmit data to the first receiver 140 that is orthogonal to $G_2W_A \| R_{21}V_A$ to meet the following equation, which has minimal, reduced or no interference from data streams intended for the first receiver 140. Similar to equation (11B), the first relay 120 managed interference caused by the second relay 130 by determining a projected direction $\Psi_B y_1$ to transmit data to the first receiver 140 that is orthogonal to $G_1W_A \| R_{12}V_A$ to meet equation (12B).

$$\Psi_B y_2 = n\Psi_B G_2 W_B S_B(1) + n_1 \Psi_B R_{21} V_B S_B(0) + Z_2 \Psi_B \quad (12A)$$

$$\Psi_B y_1 = n\Psi_B G_1 W_B S_B(0) + n_1 \Psi_B R_{12} V_B S_B(1) + Z_1 \Psi_B \quad (12B)$$

In a further example embodiment, the first relay 120 may choose $\Psi_A y_1$ and/or $\Psi_B y_1$ to meet equations (11B) and (12B), respectively based on channel estimation data determined by the central processing unit 160 stored on first relay 120. In a similar fashion, the second relay 130 may choose may choose $\Psi_A y_2$ and/or $\Psi_B y_2$ to meet equations (11A) and (12A), respectively based on channel estimation data determined by the central possessing unit 160 and stored on second relay 120.

In the next time period, the second relay 130 transmits $\Psi_A y_2$ that is a linear combination of $S_A(1)$ and $S_A(0)$ rather than only $S_A(1)$ to the first receiver 140. Additionally, the second relay 130 transmits $\Psi_B y_2$ that is a linear combination of $S_B(1)$ and $S_B(0)$ rather than only $S_B(0)$ to second receiver 150. In a somewhat similar manner as discussed above, the first relay 120 may projected a received signal based on the interference cause by the second relay 130.

As illustrated in FIG. 2, the above-mentioned method is performed over M time periods. Therefore over M time periods, the first receiver 140 has received the following signals, where L represents of linear combination of the received signals that take into consideration the effects of interference. Accordingly, the first receiver 140 only receives signals intended for the first receiver 140, as represented by the following equation.

$$L(S_A(0), S_A(1), S_A(2), \ldots, S_A(M)) \quad (13)$$

Similar, at time period M, the second receiver 150 has received the following signals. Accordingly, the second receiver 150 only receives signals intended for the second receiver 150, as represented by the following equation.

$$L(S_B(0), C(1), S_C(2), \ldots, S_B(M)) \quad (14)$$

Therefore, the first receiver 140 and the second receiver 150 have at time M a plurality of signals transmitted by the first relay 120 and the second relay 130.

Using the above-mentioned equations to determine first direction for data transmitted towards the first receiver 140, the first receiver 140 may minimize, control, or reduce the interference caused by the first relay 120 and the second relay 130 transmitting data to the second receiver 150 to recover the intended signals transmitted towards the first receiver 140. In a similar manner, the second receiver 150 may minimize, control, or reduce the interference caused by the first relay 120 and the second relay 130 transmitting data to the first receiver 140 to recover the intended signals transmitted towards the second receiver 150.

Figure 7:
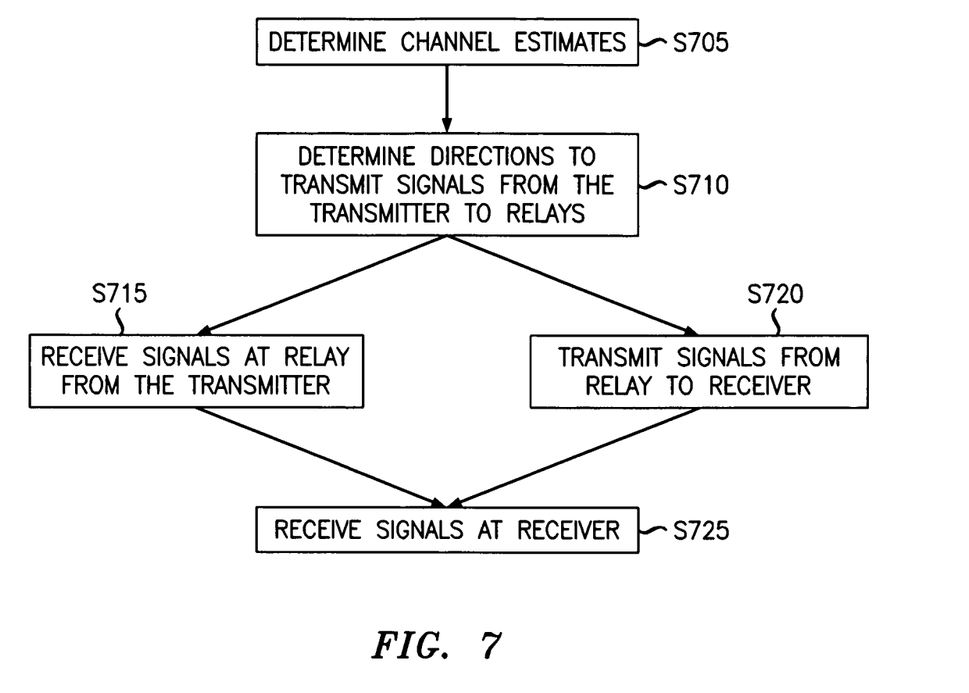
FIG. 7 is a flow chart illustrating a method for relaying data.

FIG. 7 is a flow chart illustrating operations performed by system elements of FIG. 6.

In step S705, the central processing unit 160 may determine channel estimates for the network 100.

In step S710, using the determined channel estimates the central processing unit 160 may determine equations (5) and (6) as discussed above to manage, reduce or minimize interference caused the relays within the network 100.

More specifically in step S710, the central processing unit 160 may determine the directions of $W_A$ and $W_B$ of transmit vector X as shown in equation (5). Based on the interferences $R_{21}V_A$ and $R_{21}V_B$ caused by the first relay 120 at the second relay, the central processing unit 160 and/or the transmitter 110 may determine $W_A$ and $W_B$ to reduce, limit or control the interference caused by the first relay 120, as shown in equations (9A) and (10A). Similarly, the central processing unit 160 and/or the transmitter 110 may choose $W_A$ and $W_B$ to reduce, limit or control the interference caused by the first relay 120, as shown in equations (9B) and (10B).

In step S715, the central processing unit 160 and/or the second relay 130 may determine the received signal (Y2) from the transmitter 110 using equation (5) and equation (1) as shown in equation (8A). Similarly, using equation (5) and equation (1) the central processing unit 160 and/or the first relay 120 may determine the received signal (Y1) from the transmitter 110 using equation (5) and equation (1) as shown in equation (8B).

As shown in steps S715 and S720, while the second relay 130 receives signals from the transmitter 110, the first relay 120 may transmit signals to the first and second receivers 140 and 150. Further, in steps S715 and S720 while the first relay 120 receives signals the transmitter 110, the second relay 130 may transmit signals to the first and the second receivers 140 and 150.

In step S720, the central processing unit 160 and/or the second relay 130 determine the signal transmitted from the second relay 130 to the first receiver 140 as shown in equation (11A). More specifically, equation (11A) is based on the directions of the vectors of the transmitted signal X from the transmitter 110 and the interference caused by the first relay 120. Similarly, the central processing unit 160 and/or the second relay 130 may determine the signal transmitted from the second relay 130 to the second receiver 150 as shown in equation (12A).

In a similar manner, the central processing unit 160 and/or the first relay 120 may determine the signal transmitted from the first relay 120 to the first receiver 140 or second receiver 150 as shown in equations (11B) and (12B) based on the transmitted signal X from the transmitter 110 and the interference caused by the second relay 130.

Because the first relay 120 transmits the signal as shown in 11(B) towards the first receiver 140 in a direction that is orthogonal equation (9A), the signal has no interference from signals intended for the second receiver 150. Similarly, because the first relay 120 transmits the signal as shown in 12(B) towards the first receiver 140 in a direction that is orthogonal equation (10A), the signal has no interference for signals intended for the first receiver 140.

In a similar manner, the directions for transmitting signals from the second relay 130 to the first receiver 140 and the second receiver 150 are determined.

In step S725, the first receiver 140 receives signals in accordance to equations (11A) and (11B) and the second receiver 150 receives signals in accordance to equations (12A) and 12(B) as discussed above.

Additionally, using feedback channels and/or channel estimate methods, the transmitter 110, the first relay 120, the second relay 130 and/or the central processing unit 160 may update the channel estimates within the network. Upon updating the channel estimates within the network the central processing unit 160, and/or the transmitter 110, the first relay 120, the second relay 130 may need to determine the directions for data transmitted from the transmitter 110 towards the receivers 140 and 150.

Furthermore, variations of the example embodiments are not to be regarded as a departure from the spirit and scope of the example embodiments, and all such variations as would be apparent to one skilled in the art are intended to be included within the scope of this disclosure.

I claim:

1. A method for relaying data, comprising:
   transmitting, from a transmitter, a first transmit signal to a first relay, the first transmit signal including a first data with a first direction and a second data with a second direction; and
   transmitting, from the transmitter, a second transmit signal to a second relay, the second transmit signal including a third data with the first direction and a fourth data with the second direction.

2. The method of claim 1, wherein the first data includes a first data vector, the second data includes a second data vector, the third data includes a third data vector, and the fourth data includes a fourth data vector.

3. The method of claim 1, wherein the first transmit signal is transmitted based on interference caused by the second relay to the first relay.

4. The method of claim 1, wherein the second transmit signal is transmitted based on interference caused by the first relay to the second relay.

5. The method of claim 1, wherein the first data is relayed by the first relay to a first receiver and the third data is relayed by the second relay towards the first receiver.

6. The method of claim 1, wherein the second data is relayed by the first relay to a second receiver and the fourth data is relayed by the second relay towards the second receiver.

7. A method for relaying data, the method comprising:
   receiving, by a first relay, a first transmit signal including a first data and a second data;
   determining at least one channel characteristic for relaying the first data on a first channel and the second data on a second channel based on interference caused by a second relay, the determined channel characteristic indicating a direction for transmitting the first transmit signal; and transmitting, by the first relay, the first transmit signal based on the direction according to the determined at least one channel characteristic.

8. The method of claim 7, wherein the transmitting the first transmit signal includes, transmitting the first data on the first channel to a first receiver, and transmitting the second data on the second channel to a second receiver.

9. The method of claim 8, wherein the first transmit signal includes a first relay vector for the first data and a second relay vector for the second data.

10. The method of claim 9, wherein the first data is a first data vector that has a first direction and the second data is a second data vector that has a second direction.

11. The method of claim 10, wherein the at least one channel characteristic is that the first direction is perpendicular to a channel matrix between the first relay and the second receiver.

12. The method of claim 11, wherein the second data is transmitted in a direction that is orthogonal to a product of the interference caused by the second relay and the first direction.

13. The method of claim 10, wherein the at least one channel characteristic is that the second direction is perpendicular to a channel matrix between the first relay and the first receiver.

14. The method of claim 13, wherein the first data is transmitted in a direction that is orthogonal to a product of the interference caused by the second relay and the second direction.

15. The method of claim 8, further comprising:

receiving, by the second relay, a second transmit signal including a third data and a fourth data, while the first relay receives the first transmit signal;

determining at least one further channel characteristic for relaying the third data on the first channel and the fourth data on the second channel based on interference caused by the first relay;

transmitting, by the second relay, the second transmit signal based on the determined at least one further channel characteristic.

16. The method of claim 15, wherein the transmitting the second transmit signal includes, transmitting the third data on the first channel to the first receiver, and transmitting the fourth data on the second channel to a second receiver.

17. A method relaying data, the method comprising:

receiving, at a first receiver, a relay signal from a first relay and a second relay signal from a second relay, the first relay signal including a first data and a second data and the second relay signal including a third data and a fourth data, the first relay signal being transmitted from a transmitter towards the first relay according to a determined channel characteristic indicating a direction of the first relay, and the second relay signal being transmitted from the transmitter towards the second relay according to a determined channel characteristic indicating a direction of the second relay.

18. The method of claim 17, wherein the first data is received on a first channel and the second data is received on the first channel.

19. The method of claim 17, wherein the first data and the third data include a first direction, and the second data and the fourth data include a second direction.

20. The method of claim 17, wherein the first data and the third data are received as a linear combination.

* * * * *